July 7, 1942.  F. J. CHANDLER  2,289,177
COMPOSITE FORAMINOUS MATERIAL
Filed Feb. 9, 1939
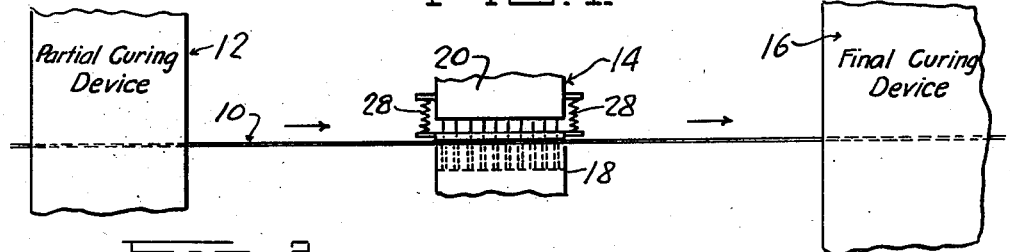
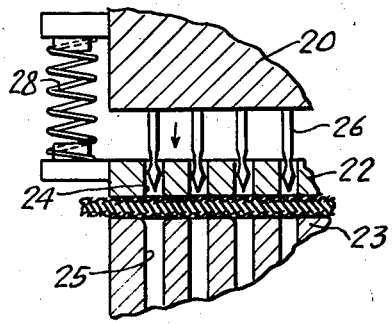
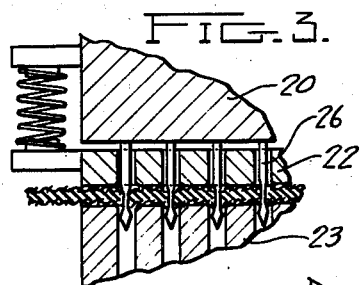
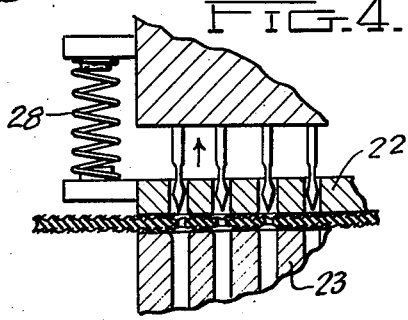
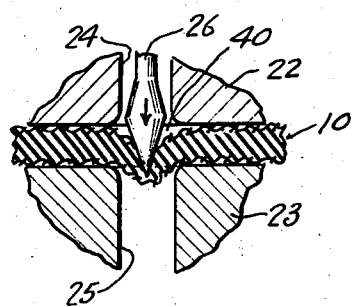
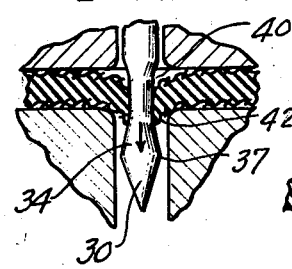
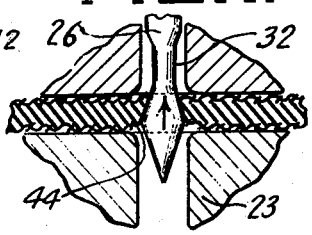
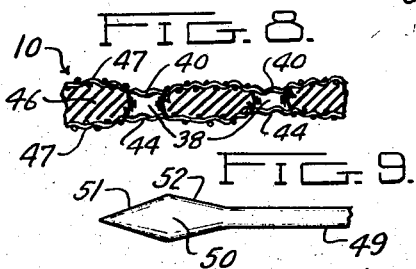
Frank Jermain Chandler
INVENTOR
BY Malcolm W. Pierce
ATTORNEY Patented July 7, 1942

2,289,177

UNITED STATES PATENT OFFICE 2,289,177

COMPOSITE FORAMINOUS MATERIAL

Frank Jermain Chandler, Toledo, Ohio, assignor to The Perfotex Company, Toledo, Ohio, a corporation of Ohio Application February 9, 1939, Serial No. 255,557

1 Claim. (Cl. 154—43)

This invention relates to a method of and means for producing a composite foraminous material.

An object of the invention is to provide ways and means for perforating a body or strip of composite material, such as rubber and a textile fabric, so that the opposite faces thereof adjacent the perforations are smooth and regular.

Another object of the invention is to provide a new and novel method of uniting the adjacent layers of a composite body and to produce an improved composite material thereby.

A further object of the invention is to provide a novel perforating tool or needle for carrying out the method of the present invention in a simple and inexpensive manner.

A still further object is to provide a method of and means for producing a continuous strip of composite foraminous material having a multiplicity of perforations therein, each perforation having uniform edge portions at opposite sides of the strip.

Further objects and advantages will become apparent from a study of the following description when taken in connection with the accompanying drawing in which:

Figure 1 is a diagrammatic illustration of the several mechanisms which may be utilized in performing the process of the present invention;

Figures 2, 3 and 4 are enlarged fragmentary sectional views showing various steps in the perforation of a composite body in accordance with the invention;

Figures 5, 6 and 7 are enlarged fragmentary sectional views illustrating one form of perforating tool or needle in various positions during the perforation of the material;

Figure 8 is a fragmentary sectional view of the material after perforation; and

Figure 9 illustrates another form of perforating tool or needle for carrying out the invention.

Referring for the present to Figure 1 of the drawing, 10 illustrates a web or strip of composite material being processed. The material is preferably initially partially cured in a suitable device shown diagrammatically at 12, and subsequently passes through a perforating device 14, from which the web is suitably conveyed through a final curing device 16. The final curing device 16 may be of any convenient type, preferably capable of curing a composite web or strip comprising a rubber body or layer, and a layer of woven or knitted textile suitably bonded or partially bonded to one or both sides of the rubber layer. The device 12 is desirably of a type capable of imparting some elastic properties to the rubber stock but which retains the rubber in a substantially uncured state.

The perforating device 14 may be of any suitable form, and is illustrated as comprising a bed or die portion 18 and a relatively movable punch portion 20. As particularly shown in Figures 2, 3 and 4, the die portion comprises upper and lower sections 22 and 23, respectively, spaced to permit the passage of web 10 therethrough. The die sections are provided with a multiplicity of cooperating apertures 24 and 25, respectively, for reception of perforating tools or needles 26 carried by the movable punch member 20. Means in the form of expansion springs 28 have been shown as being illustrative of a suitable arrangement for cushioning the movement of the punch member, as well as aiding in the separation of the punch from the die after the down stroke of the punch is completed.

Needles 26 are arranged perpendicularly of the web being perforated, and may be secured to the punch member in any desired manner. The needles are shown in Figures 2 to 7 as being conically pointed at 30, and provided with a reduced cylindrical portion 32 and an intermediate reversely tapered conical portion 34. The reduced portion 32 is blended into the shank of the needles at 36 to form a semi-spherical shoulder. The conical portions of the needle provide a head portion having an intermediate diameter at 37, corresponding to the diameter of the needle shank. Accordingly, upon being pierced by the needles, the web is perforated with a plurality of apertures 38 having slightly less diameter than the shanks or the widest diameter of the needles.

As particularly shown in Figures 5, 6 and 7, the needles descend through the web 10 and displace the material immediately adjacent thereto during the downstroke. As the needle head passes through the material, the aperture 38 tends to close about the reduced portion 32 of the needle. Thus far, the upper edge of the hole is depressed as at 40, while the lower edge is extended downwardly at 42. However, upon withdrawal of the needle during the upstroke, the extended edge 42 tends to adhere to the conical portion 34, which returns the edge portion 42 into the plane of the web, and further provides a slight depression 44 in the lower surface. The resultant apertures retain the slightly chamfered edges 40 and 44, as particularly noted in Figure 8.

The finished web is illustrated in Figure 8, where it will be noted that the material comprises an intermediate layer or ply of rubber 46, having a textile or fabric layer or ply 47 bonded to each face thereof. In addition to perforating the material, the needles also serve to force the strands of textile fabric adjacent the apertures into the rubber layer at each side thereof, which results in a further uniting of the adjacent layers to produce an improved composite material. More particularly, this union between the adjacent upper layers is produced during the down or perforating stroke of the needles and between the adjacent lower layers during retraction or up stroke of the needles, as will be readily understood.

A modified form of needle has been shown in Figure 9, wherein the shank 49 is of a comparatively small diameter and provided with an enlarged head 50 formed with a conical point 51 and a reversely coned portion 52. The largest diameter of the head is intermediate the cones, and is such that the desired aperture may be produced thereby, as in the previously described form of needles.

Heretofore perforating needles have been formed with a shank of uniform diameter and a point of a conventional conical form, and, consequently, the perforations have been formed with depressions about their upper edges, and their lower edges are burred or projected outwardly leaving a rough, irregular surface. By means of the needles of the present invention, however, it is to be noted that as the head of the needle is projected through the web, the material tends to contract or close around the reduced portion of the needle. Upon subsequent withdrawal of the needle, any material about the lower edge of the aperture is withdrawn with the needle and shifted or returned into the plane of the web or into intimate engagement with the rubber ply in the region of the inside of the aperture. Thus the perforation is formed without a projection or roughness adjacent its upper or lower edge, the upper and lower edges thereof being substantially uniform and being similarly beveled or chamfered.

From the foregoing, the method of producing a foraminous textile material in accordance with the present invention has been generally indicated. More particularly the method includes the step of partially curing composite web of rubber and textile or fabric material, such initial cure serving only to impart slight resilience to the material and retain the rubber in a substantially uncured state to enhance the effectiveness of subsequent perforation. It is to be understood that the following steps may be performed on an uncured web, and, therefore, partial curing is not necessarily an essential step in the instant process. The web is then passed through the perforating mechanism, wherein a multiplicity of minute apertures are formed in the material, and simultaneously therewith the layers of the composite structure are further and securely united together. The perforating step is primarily one of forcing an enlarged headed needle through the material in a manner to produce an aperture having its opposite edges free of projections and by forming a slight bevel or chamfer at each edge thereof. The perforated web is subsequently cured to the desired state and the material ready for its intended use. In the final curing step, the apertures somewhat shrink or become smaller and accordingly the textile strands are drawn more intimately into engagement with the rubber ply in the region of the apertures.

Although the invention has been described in connection with the details of producing a particular foraminous material, it will be clearly understood that the process is equally applicable to other materials, and that the perforating tool or needle is susceptible to other and varied uses. The invention, therefore, is not to be limited to the specific embodiments chosen for illustration, but is intended to cover all modifications and adaptations thereof.

What I claim is:

A composite material comprising a rubber ply, a textile fabric ply on each side of the rubber ply and adhered thereto, registering intrusive perforations in said rubber and textile plies, said intrusive perforations constituting spread apart portions of the rubber ply and spread apart strands of each of the textile plies and strands of said textile plies on each side in the region of each of said perforations extending into and united with said rubber ply, the edge portions of each perforation at opposite ends thereof being chamfered.

FRANK JERMAIN CHANDLER.